United States Patent [19]

Wright et al.

[11] Patent Number: 4,727,579
[45] Date of Patent: Feb. 23, 1988

[54] SCRAMBLED TELEVISION SIGNALS

[75] Inventors: Derek T. Wright, Crawley; Gerald O. Crowther, Sutton, both of England

[73] Assignee: U.S. Philips Corporation, New York, N.Y.

[21] Appl. No.: 609,257

[22] Filed: May 11, 1984

[30] Foreign Application Priority Data

May 13, 1983 [GB] United Kingdom ............... 8313294

[51] Int. Cl.⁴ .......................................... H04N 7/167
[52] U.S. Cl. ........................................ 380/20; 380/37; 380/46
[58] Field of Search ................. 358/121, 122, 123, 12, 358/141, 142, 146; 178/22.05, 22.15; 375/2.1; 380/19, 20, 37, 46

[56] References Cited

U.S. PATENT DOCUMENTS

| 4,070,693 | 1/1978 | Shutterly | 358/123 |
|---|---|---|---|
| 4,074,066 | 2/1978 | Ehrsam et al. | 178/22.06 |
| 4,171,513 | 10/1979 | Otey et al. | 178/22.13 |
| 4,225,884 | 9/1980 | Block et al. | 358/124 X |
| 4,266,243 | 5/1981 | Shutterly | 358/121 |
| 4,388,643 | 6/1983 | Aminetzah | 358/114 X |
| 4,424,532 | 1/1984 | den Toonder et al. | 358/121 X |
| 4,464,678 | 8/1984 | Schiff et al. | 358/123 X |
| 4,484,027 | 11/1984 | Lee et al. | 178/22.13 |
| 4,547,802 | 10/1985 | Fogarty et al. | 358/123 X |

Primary Examiner—Stephen C. Buczinski
Assistant Examiner—Linda J. Wallace
Attorney, Agent, or Firm—Thomas A. Briody; William J. Streeter; Gregory P. Gadson

[57] ABSTRACT

A television receiver for receiving scrambled television signals has an arrangement (3) which provides scrambled video components (V) and packet arranged sound-/data components (D) some of which are also scrambled. The components (D) are applied to a packet demultiplexer (4) where the packets are assembled from the data in several lines in the signal to provide at a first output (P), the respective packets carrying sound/data information and, at a second output (E), encrypted control data which is applied to a sub-system (6) to produce a video scrambling control word (VS) for each line of the video components. The sub-system (6) during each line produces further bits which are applied to a descrambling control word generator (7) which assembles these further bits from three lines to form a packet scrambling control word. This control word and the packets associated with it are added in an adder (5) and applied to a main packet buffer store (8) from which each packet is read out by a packet selector (9), and the packet is applied to a packet descrambler (12) while the packet scrambling control word is selected by a register (11) and used to control the generation of a binary sequence by a pseudo random binary sequence generator (13), this sequence being added to the packet in the descrambler (12), modulo-two, to achieve descrambling. A packet identifier (10) examines the packet address to ensure the packet requires descrambling and inhibits the generator (13) should descrambling not be required. With such a receiver the control data (E) can be used for controlling descrambling of both the video and the sound/data components.

18 Claims, 2 Drawing Figures

SCRAMBLED TELEVISION SIGNALS

BACKGROUND OF THE INVENTION

This invention relates to a method of generating video scrambling control words for the line-by-line scrambling or descrambling of the video components of a television signal in which control data, having a rate which is low relative to that of the line rate of the television signal, is employed to control the generation of the video scrambling control word for each line of the video components. The invention also relates to a television receiver employing this method.

A method of the above type is disclosed in U.S. Pat. No. 4,070,693 where each line of the video components of a television signal is scrambled by cutting the line and by changing the cut-point for each line. This is done in a random manner by a locally generated random sequence at the transmission source and a corresponding random sequence locally generated in the television receiver. Both random sequences are periodically reset by control data at a rate which is low relative to that of the line rate of the television signal, which control data is transmitted with the television signal. Such a method provides a relatively secure scrambling system.

SUMMARY OF THE INVENTION

It is an object of the invention to provide a method of the above type which also makes provision for the scrambling and descrambling of sound/data signals.

The invention provides a method of generating video scrambling control words for the line-by-line scrambling or descrambling of the video components of a television signal in which control data, having a rate which is low relative to that of the line rate of the television signal, is employed to control the generation of the video scrambling control word for each line of said video components, characterized in that said television signal additionally contains digitally modulated sound-/data information multiplexed into blocks, said control data also being employed to control the generation of block scrambling control words, one for each block of said sound/data information, for controlling the scrambling or descrambling of each of those blocks required to be scrambled or descrambled.

The above method has the distinct advantage that the control data may be employed not only to control the generation of the video scrambling control words, but also to control the generation of the sound/data scrambling control words and thus it is not necessary, with the present invention, to transmit separate control data over separate channels for the video and sound/data components, respectively.

Where each block is longer than the digital components contained in two lines, the invention may be further characterized in that the means generating each video scrambling control word additionally generates, during each line period, a part of a block scrambling control word, each block scrambling control word being assembled from the parts in a number of lines preceding that line in which the associated block commences, which number corresponds to the nearest whole number which is less than that number of lines in a block.

Where the video scrambling control words identify the manner of scrambling of the lines of the video components for the purpose of scrambling and descrambling, the invention may be further characterized in that each block scrambling control word resets a pseudo-random binary sequence at the start of each such block for the modification of said sequence to the data stream in that block for the purpose of scrambling or descrambling.

The invention may be further characterized in that each block scrambling control word is stored together with the block with which it is associated, each block scrambling control word and associated block being subsequently read and the block interrogated to determine whether the block requires descrambling or not.

The invention also provides a television receiver for receiving and processing scrambled video components and scrambled digitally modulated sound/data information, comprising means for additionally receiving control data which has a rate which is low relative to that of the line rate of said television signal, generating means for generating video scrambling control words for the line-by-line descrambling of the video components, said generating means producing a control word for each line of said video components, which generating means is periodically reset by said control data, characterized in that said receiver additionally comprises generating means for generating block scrambling control words, one for each block of sound/data information, for controlling the descrambling of each block requiring descrambling, and which is also periodically reset by said control data.

With a receiver where each block is longer than the digital components in two lines, the invention may be further characterized in that the generating means for generating the video scrambling control words and the generating means for generating the block scrambling control words comprises a single generator producing, during a line period, a video scrambling control word and a part of a block scrambling control word, said block scrambling control word being formed by combining said parts produced during a number of lines, which number is the nearest whole number of line periods which is less than the number of lines in a block.

Such a receiver may be further characterized in that it further comprises a store in which each block scrambling control word is stored together with the block with which it is associated, means for selectively reading each block and associated control word from said store, and means for interrogating the block to determine whether said block requires descrambling or not. The selectively read control word may then be used to reset a packet descrambling generator at the start of a packet, which generator produces, during said block, a pseudo-random binary sequence which is applied, together with said block, to a descrambler wherein the bit stream of said block is modified by said binary sequence to achieve descrambling. With such a receiver, the block descrambling generator may be inhibited when said block does not require descrambling.

DESCRIPTION OF THE DRAWING

The above and other features of the invention will now be described, by way of example, with reference to the following description and the accompanying drawing, in which.

DESCRIPTION OF THE PREFERRED EMBODIMENT

Figure 1:
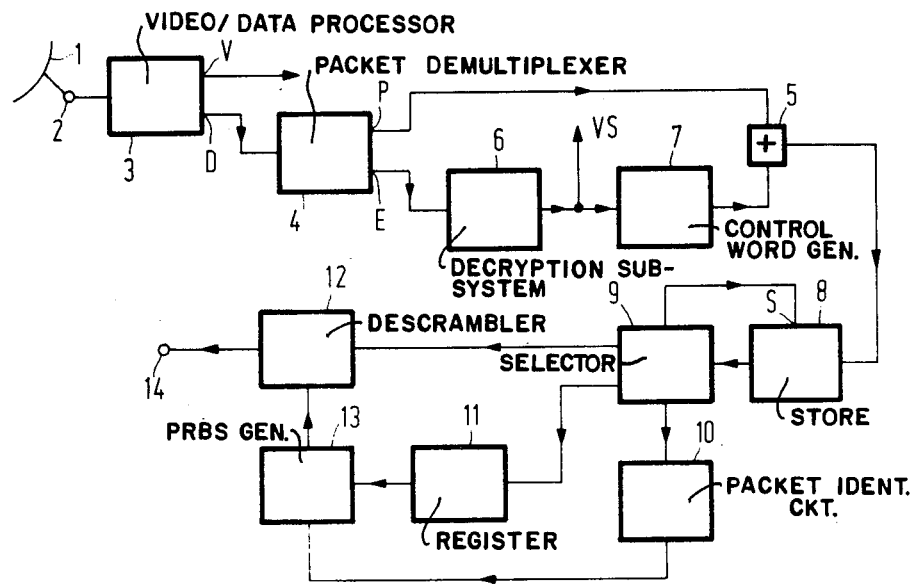
FIG. 1 is a block diagram of a television receiver for use with the present invention.

In the diagram of FIG. 1, the reference 1 indicates a dish aerial for receiving off-air transmissions of a television signal from a direct broadcasting satellite (DBS), the received signals being of the C-MAC Packet Type conforming to the proposed European Broadcasting Union (EBU) standard for satellite broadcasting present in the EBU document Com. T481 dated April 1983, which was subsequently updated in the EBU Draft New Report "Television Standards for 625-line 12 GHz Satellite Broadcasting", SPB 284 dated June 1983. The received C-MAC Packet signals are applied to an input 2 of a television receiver which is connected to circuits 3 for processing the incoming signal to produce at a first output V, a video signal and at a second output D, the data bursts of the C-MAC Packet signal containing the sound/data information in multiplexed block (packet) form. From the above EBU documents, it will be seen that the television signal is time multiplexed during a line period with the video signal in component form (a chrominance component and a luminance component) which may be scrambled, while the sound/data information is transmitted in packets of 751 bits, 195 bits out of 203 bits in the data burst of each line contributing to a packet or packets. Thus, each packet occupies approximately 3.85 lines of data burst. The video signal is applied to circuits (not shown) for further processing, including descrambling, to produce a television display from the incoming television signal.

The separated data bursts from terminal D are applied to a packet demultiplexer circuit 4 where the data bursts are assembled into their individual packets, the packet-by-packet output P of this circuit 4 being applied to a first input of an adder 5. An output E of the packet demultiplexer circuit 4 provides low rate encrypted control data which is passed from the transmssion source to the receiver via a separate and securely encrypted data channel in the off-air transmission and may form part of the data burst. This encrypted data is applied to the inputs of a decryption sub-system 6 in the form of a plastic card (of a similar size to a credit card) which a subscriber obtains separately from the receiver and which is inserted into an appropriate aperture in the television receiver, the aperture containing suitable connections for making contact with corresponding contacts on the card. The card carries an integrated circuit which decrypts the encrypted control data and produces a pseudo random bit sequence (P.R.B.S.) which is periodically reset by the decrypted control data, the P.R.B.S. being 16 bits per television line. The output of the decryption sub-system 6 is applied to the input of a sound/data descrambling control word generator 7 and is also applied to a terminal VS from which the first 8 bits per line are taken for use as the video descrambling control word for each line of the video signal, which signal may have been scrambled by being cut at one out of 256 possible positions. The descrambling control word generator 7 takes the remaining 8 bits per line and assembles these bits from three successive lines to form a 24 bit sound/data packet descrambling control word which is associated with a packet which commences in the line following the third of these lines. For instance, if a packet were to start during the data burst in line 12 then the required 24 bits would be derived during the 8 further bits generated during lines 9, 10 and 11. This packet descrambling control word from the output of the control word generator 7 is applied to the second input of the adder 5 whose output is applied to a main packet buffer store 8 where synchronism between the packet descrambling control word and its associated packet is preserved by storing the value of the descrambling control word together with its associated sound/data packet.

The packet store 8 operates as a FIFO (first-in-first-out) and one packet and its associated descrambling control word are picked out, one at a time, for descrambling by a "next packet" selector 9, an output of which is applied to the selector input S of the store 8 for this purpose. The selected packet is conveyed by the packet selector 9 via a further output to a packet identification circuit 10 to check the Packet Type (PT) byte in the packet header in order to establish whether the packet content is sound/data signal or sound/data control information since interpretation packets (BI) are not scrambled and hence, the descrambling arrangement must be inhibited when such an interpretation packet is identified by the identification circuit 10 which then does not produce an enable signal at its output. For a scrambled sound/data signal packet, the descrambling arrangement must operate. A further output of the packet selector 9 is connected to a descrambling control word register 11 which selects the descrambling control word associated with a packet while the packet content is applied from the packet selector 9 to a descrambler 12.

Scrambling of the sound/data signal is achieved at its transmission source by adding, modulo-two, a pseudorandom binary sequence (P.R.B.S.) produced by a suitable generator to the serialized digital bit stream of the sound/data signal, and in the receiver, descrambling is achieved by adding, modulo-two, the same P.R.B.S. generated by a local generator. This local generator is synchronized to the local data stream with the same relationship as that held by the P.R.B.P. generator at the transmission source. Security of the system is obtained by resetting the P.R.B.S. generator at the transmission source at the start of each packet to a particular point in its sequence, the corresponding generator in the receiver being correspondingly reset at each packet.

In FIG. 1, a P.R.B.S. generator 13 provides the sequence for descrambling which is applied to a further input of the descrambler 12 (which takes the form of an exclusive OR-gate) to be added, modulo-two, to the data stream of a packet, the resetting of the P.R.B.S. generator 13 being achieved by the packet descrambling control word at packet rate from the descrambling control word register 11 such that the P.R.B.S. generator 13 is reset at the start of each packet. The output of the packet identification circuit 10 enables the P.R.B.S. generator 13 when descrambling is required, but absence of an enable signal at this output, inhibits the operation of this generator so that descrambling is not performed.

The descrambled sound/data information from the descrambler 12 is applied to a connecting terminal 14 which forms the output to error protection and other circuits for the further processing of the packet information to recover the sound/data information in the receiver.

In the arrangement of FIG. 1, a high-speed data transfer of 250K bits per second is used between the decryption sub-system 6 and the other parts of the television receiver. In some cases, it may be preferred not to employ such a high data bit rate across the interface between the sub-system and the receiver, in which case data must be transferred at a lower speed for instance over a D²B data bus. A receiver for such a lower speed data transfer is shown in FIG. 2 where corresponding components are given the same references as are employed in FIG. 1.

Figure 2:
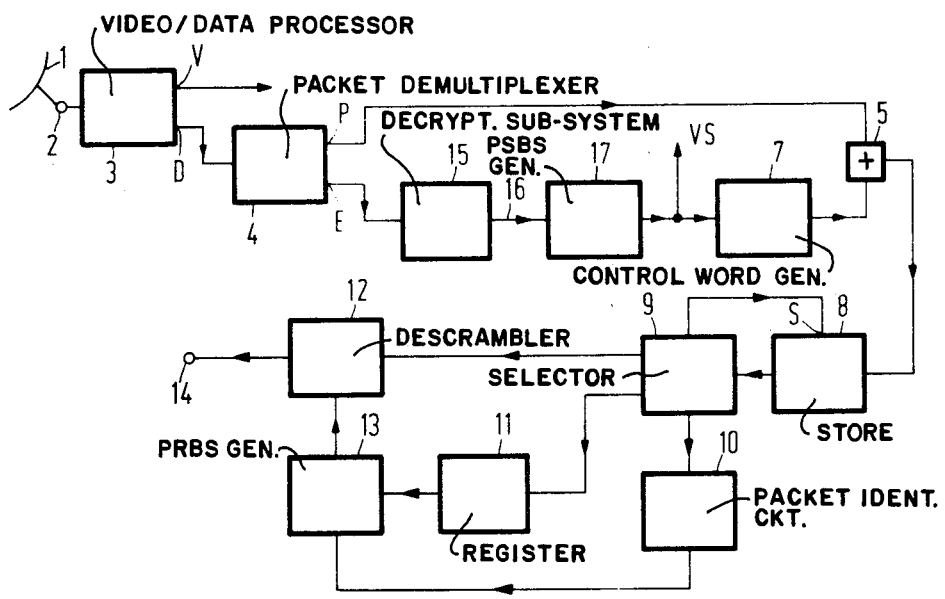
FIG. 2 is a modification of the television receiver shown in FIG. 1.

In FIG. 2, the output E from the packet demultiplexer 4 is applied to a decryption sub-system 15 again of the card type. However, this sub-system 15 does not generate the required P.R.B.S. but rather produces at its output the decrypted control data at the low rate (say once per second) and conveys it over the D²B bus 16 in the receiver to a P.R.B.S. generator 17 which generates the required 16 bits per television line. The output of this generator 17 is applied to the terminal VS and the input of the packet descrambling control word generator 7 in the same manner as in FIG. 1, the operation of the remaining parts of FIG. 2 being the same as that for FIG. 1.

Although FIGS. 1 and 2 are respectively concerned with the relatively high and low speed transfer of data between the sub-system 6 or 15 and the receiver, it may be required to produce a receiver capable of both modes of operation. In such a case the two modes could be combined in one receiver and the operations would be compatible if it is designed so that data transferred via the higher-speed interface (if present) overwrites that internally generated within the receiver.

In the above description, reference has been made to the descrambling of the video and sound/data signals in the receiver and it will be realized that substantially the same techniques may be employed at the transmission source for the scrambling of these signals.

We claim:

1. A method of generating video scrambling control words for the line-by-line scrambling or descrambling of video components of a television signal in which control data having a rate which is low relative to that of the line rate of the television signal is employed to control the generation of the video scrambling control word for each line of said video components, wherein said television signal additionally contains digitally modulated sound/data information multiplexed into blocks, and said method further comprises generating, under control of said control data, respective block scrambling control words for said blocks of said sound-/data information, for controlling the scrambling or descrambling of each of those blocks required to be so scrambled or descrambled, and wherein each block is longer than the sound/data information contained in two lines, characterized in that in the generating of each video scrambling control word, said method additionally comprises generating, during each line period, a part of a block scrambling control word, each block scrambling control word being assembled from the parts in a number of lines preceding that line in which a block to be scrambled or descrambled commences, said number of lines corresponding to the nearest whole number which is less than that number of lines in a block.

2. A method of generating video scrambling control words for the line-by-line scrambling or descrambling of video components of a television signal in which control data having a rate which is low relative to that of the line rate of the television signal is employed to control the generation of the video scrambling control word for each line of said video components, wherein said television signal additionally contains digitally modulated sound/data information multiplexed into blocks, and said method further comprises generating, under control of said control data, respective block scrambling control words for said blocks of said sound-/data information, for controlling the scrambling or descrambling of each of those blocks required to be so scrambled or descrambled, characterized in that each block scrambling control word is stored together with the block with which is is associated, each block scrambling control word and associated block being subsequently read and the block being interrogated to determined whether the block requires descrambling or not.

3. A method as claimed in claim 2, characterized in that the selectively read control word is used to reset the pseudo-random binary sequence.

4. A television receiver for receiving and processing scrambled video components and scrambled digitally modulated sound/data information, comprising means for additionally receiving control data which has a rate which is low relative to that of the line rate of said television signal, generating means for generating video scrambling control words for the line-by-line descrambling of the said video components, said generating means producing a control word for each line of said video components, said generating means being periodically reset by said control data, wherein said receiver additionally comprises generating means for generating block scrambling control words, one for each packet of sound/data information, for controlling the descrambling of each block requiring descrambling, and which is also periodically reset by said control data, and wherein each block is longer than the sound/data information contained in two lines, characterized in that the generating means for generating the video scrambling control words and the generating means for generating the block scrambling control words comprises a single generator producing, during a line period a video scrambling control words and part of a block scrambling control word, said block scrambling control word being formed by combining respective parts of said block scrambling control word contained in respective video scrambling control words produced during a number of lines, said number of lines being the nearest whole number of line periods which is less than the number of lines in a block.

5. A television receiver for receiving and processing scrambled video components and scrambled digitally modulated sound/data information, comprising means for additionally receiving control data which has a rate which is low relative to that of the line rate of said television signal, generating means for generating video scrambling control words for the line-by-line descrambling of the said video components, said generating means producing a control word for each line of said video components, said generating means being periodically reset by said control data, wherein said receiver additionally comprises generating means for generating block scrambling control words, one for each packet of sound/data information, for controlling the descrambling of each block requiring descrambling, and which is also periodically reset by said control data, characterized in that said receiver further comprises a store in which each block scrambling control word is stored together with a block with which said block scrambling control word is associated, means for selectively reading each block and associated control word from said store, and means for interrogating the block to determine whether said block requires descrambling or not.

6. A receiver as claimed in claim 5, characterized in that said receiver further comprises a block descrambling generator coupled to said selectively reading means for receiving said selectively read control word as a reset at the start of a block, said block descrambling generator producing, during said block, a pseudo-random binary sequence which is applied, together with said block, to a descrambler wherein the bit stream of said block is modified by said binary sequence to achieve descrambling.

7. A receiver as claimed in claim 6, characterized in that said selectively reading means inhibits said block descrambling generator when said block does not require descrambling.

8. A television receiver for receiving a television signal containing scrambled digitally modulated sound and/or data information in blocks which are time multiplexed with video information, and comprising descrambling means for generating descrambled sound-/data signals from the received television signal, and means for additionally receiving control data which has a rate which is low relative to that of the line rate of the television signal for use in descrambling, wherein said receiver additionally comprises control word generating means responsive to the control data for generating a control word for each block, means for storing each control word together with the block with which it is associated, and means for conditioning the descrambling means for descrambling each block in response to the associated stored control word, characterized in that each block is longer than the sound/data information contained in two lines, and, during each line, part of a block scrambling control word is generated, each control word being assembled from the parts in a plurality of lines preceding that line in which the associated block commences.

9. A television receiver for receiving a television signal containing scrambled digitally modulated sound and/or data information in blocks which are time multiplexed with video information, and comprising descrambling means for generating descrambled sound-/data signals from the received television signal, and means for additionally receiving control data which has a rate which is low relative to that of the line rate of the television signal for use in descrambling, wherein said receiver additionally comprises control word generating means responsive to the control data for generating a control word for each block, means for storing each control word together with the block with which it is associated, and means for conditioning the descrambling means for descrambling each block in response to the associated stored control word, characterized in that said receiver includes means for interrogating each block to determine whether the block needs descrambling, and, if not, for inhibiting the descrambling operation of the descrambling means.

10. A television receiver as claimed in claim 8, characterized in that said receiver includes means for interrogating each block to determine whether the block needs descrambling and, if not, for inhibiting the descrambling operation of the descrambling means.

11. A television receiver as claimed in claim 8, characterized in that the descrambling means comprises a pseudo-random binary sequence generator, and means for combining the generator output bit-by-bit with the bits of the sound/data information to effect descrambling.

12. A television receiver as claimed in claim 11, characterized in that the pseudo-random sequence generator is conditioned for each block by being reset to a value dependent upon the associated control word.

13. A television receiver as claimed in claim 9, characterized in that the descrambling means comprises a pseudo-random binary sequence generator, and means for combining the generator output bit-by-bit with the bits of the sound/data information to effect descrambling.

14. A television receiver as claimed in claim 13, characterized in that the pseudo-random sequence generator is conditioned for each block by being reset to a value dependent upon the associated control word.

15. A television receiver as claimed in claim 10, characterized in that the descrambling means comprises a pseudo-random binary sequence generator, and means for combining the generator output bit-by-bit with the bits of the sound/data information to effect descrambling.

16. A television receiver as claimed in claim 15, characterized in that the pseudo-random sequence generator is conditioned for each block by being reset to a value dependent upon the associated control word.

17. A method of generating video scrambling control words for the line-by-line scrambling or descrambling of video components of a television signal in which control data having a rate which is low relative to that of the line rate of the television signal is employed to control the generation of the video scrambling control word for each line of said video components, wherein said television signal additionally contains digitally modulated sound/data information multiplexed into blocks, and said method further comprises generating, under control of said control data, respective block scrambling control words for said blocks of said sound-/data information, for controlling the scrambling or descrambling of each of those blocks required to be so scrambled or descrambled, and wherein the video scrambling control words identify the manner of scrambling of the lines of the video components for the purpose of scrambling and descrambling characterized in that each block scrambling control word resets a pseudo-random binary sequence at the start of each block for the modification of said sequence to the data stream in said block for the purpose of scrambling or descrambling, and in that each block scrambling control word is stored together with the block with which it is associated, each block scrambling control word and associated block being subsequently read and the block being interrogated to determine whether the block requires descrambling or not.

18. A method as claimed in claim 17, characterized in that the selectively read control word is used to reset the pseudo-random binary sequence.

* * * * *